3,082,107
PROCESS OF MANUFACTURING WATER-SOLUBLE PLASTIC OBJECTS FROM WATER-SOLUBLE SALTS OF A CELLULOSE ACYL SULFATE
John E. Kiefer and George P. Touey, Kingsport, Tenn., assignors to Eastman Kodak Company, Rochester, N.Y., a corporation of New Jersey
No Drawing. Filed Apr. 4, 1960, Ser. No. 19,458
7 Claims. (Cl. 106—180)

This invention relates to a process of manufacturing water-soluble films and fibers from water-soluble salts of cellulose acyl sulfate.

The manufacture of water-soluble salts of cellulose acyl sulfates, such as cellulose acetate sulfate and cellulose propionate sulfate, has been described in U.S. Patents 2,582,009 and 2,622,079. The manufacture of water-soluble films and fibers from other materials, is known in the art. However, such films and fibers have always been made by the evaporation of water from an aqueous solution of the material.

We have found that water-soluble films and fibers can be made by compounding a water-soluble salt of a cellulose acyl sulfate with a water-soluble plasticizer and a stabilizer at an elevated temperature in the substantial absence of water, and molding, melt-extruding or otherwise forming the resultant composition. The stabilization of the salts of cellulose acetate sulfate by means of urea is described and claimed in our copending application Ser. No. 813,061, now U.S. Patent No. 3,000,876.

The water-soluble salts of cellulose acyl sulfates which are suitable for use in carrying out our invention include the sodium, potassium and ammonium salts which are substantially neutral and contain 4 to 8% combined sulfur and 20 to 34% acyl. From 50 to 90 parts by weight of a water-soluble salt of cellulose acyl sulfate, 50 to 10 parts by weight of a water-soluble plasticizer for the cellulose ester, and 0.5 to 3.0 parts by weight of a stabilizer for the cellulose ester, for example urea, are compounded by conventional techniques, such as by softening on hot rolls or by melt extrusion. The composition can then be compression-molded, injection-molded, melt extruded or melt-spun to form water-soluble film or fiber or other water-soluble plastic objects.

Water-soluble plasticizers which are useful in carrying out our invention include polyhydric alcohols, hydroxyl-containing ethers and hydroxyl-containing esters which are solvents for the cellulose acyl sulfate at 150–170° C. and have a boiling point above about 180° C. Examples of suitable plasticizers are glycerol, hydroxyethyl glycerol, hydroxypropyl glycerol, ethylene glycol, diethylene glycol, propylene glycol, monoacetin, diacetin, monopropionin, dipropionin, the mono- and diacetates and propionates of hydroxyethyl- and hydroxylpropyl-glycerol, and the mono-acetates and propionates of the water-soluble alkylene glycols.

Stabilization of these compositions is best obtained by incorporating 0.5 to 3.0% of urea.

We give the following examples as illustration of the method of carrying out our invention.

*Example 1.*—Seventy parts of sodium cellulose acetate sulfate containing 6.5% sulfur and 29% acetyl, prepared by the method described in U.S. Patent 2,622,079, 28 parts of triethylene glycol and 2 parts of urea were thoroughly mixed. The mixture was blended by rolling on a rotating drum at 130° C. The resulting gum-like mass was cooled and granulated, then melt-extruded at 150° C. to form a clear, flexible, water-soluble film.

*Example 2.*—Sixty parts of sodium cellulose acetate sulfate (5.3% sulfur and 31% acetyl), 37 parts of monoacetin, and 3 parts of urea were mixed, and then melted on a rotating drum maintained at 130° C. The gum like mass was cooled and granulated, and could be molded to form clear, water-soluble, tough plastic objects.

*Example 3.*—A film prepared as in Example 1 was cu into strips 2 inches wide and 6 inches long. The strip were folded lengthwise and the sides were heat-sealed, ; Sintenel Impulse Sealer being used. Bags formed in thi manner were filled with a powdered detergent. The to of the bag was then sealed. When these bags wer dropped into water, the bag and the detergent dissolve in the water. Several of the bags were filled with dy formulations and closed by heat-sealing. When thes bags were put into water, the bags dissolved and the dy was readily dispersed in the water. Such bags are usefu for packaging many kinds of products in unit quantities for example, the proper amount of detergent for a washe load of laundry. The entire package may be throw into the washer, whereupon the bag dissolves and release the detergent into the water.

Water-soluble yarns, which can be formed from th compositions herein described by melt-spinning, may b used as support yarns for yarns which are not capabl of withstanding the normal weaving process, and ma then be removed from the fabric by washing.

We claim:
1. A process of manufacturing water-soluble plasti objects in attenuated form, which comprises compound ing a water-soluble salt of a cellulose acyl sulfate con taining 4 to 8% combined sulfur and 20–34% acyl witl approximately 11 to 100% based on the weight of th cellulose acyl sulfate salt of a water-soluble plasticize therefor selected from the group consisting of the poly hydric alcohols, the hydroxyl containing ethers and th hydroxyl containing esters and a stabilizing amount o urea at an elevated temperature in the substantial absenc of water, and forming the article from this compositio by a process involving the application of heat and pressure
2. A process of manufacturing water-soluble plasti objects in attenuated form, which comprises compound ing a water-soluble salt of cellulose acetate sulfate con taining 4 to 8% combined sulfur and 20–34% acety with approximately 11 to 100% based on the weight o the cellulose acyl sulfate salt of a water-soluble plasti cizer therefor selected from the group consisting of th polyhydric alcohols, the hydroxyl containing ethers an the hydroxyl containing esters, and a stabilizing amoun of urea at an elevated temperature in the substantial ab sence of water, and forming the article from this com position by a process involving the application of hea and pressure.
3. A process of manufacturing water-soluble plasti film, which comprises compounding a water-soluble sal of cellulose acetate sulfate containing 4 to 8% combine sulfur and 20–34% acetyl with approximately 11 to 100% based on the weight of the cellulose acyl sulfate salt o a water-soluble plasticizer therefor selected from the grou consisting of the polyhydric alcohols, the hydroxyl con taining ethers and the hydroxyl containing esters and stabilizing amount of urea at an elevated temperature i the substantial absence of water, and melt-extruding th composition into sheet form.
4. A process of manufacturing a water-soluble plasti fiber, which comprises compounding a water-soluble sal of cellulose acetate sulfate containing 4 to 8% combine sulfur and 20–34% acetyl with approximately 11 to 100% based on the weight of the cellulose acyl sulfate salt o a water-soluble plasticizer therefor selected from th group consisting of the polyhydric alcohols, the hydroxy containing ethers and the hydroxyl containing esters an a stabilizing amount of urea at an elevated temperatur in the substantial absence of water, and melt-spinning the composition.

5. A heat formed water-soluble plastic object in attenuated form essentially consisting of a water-soluble salt of a cellulose acyl sulfate containing 4–8% combined sulfur and 20–34% acyl, 11–100% based on the weight of the cellulose ester salt, of a water-soluble plasticizer selected from the group consisting of the polyhydric alcohols, the hydroxyl containing ethers and the hydroxyl containing esters and a stabilizing amount of urea.

6. A melt-extruded water-soluble plastic film essentially consistng of a water-soluble salt of cellulose acetate sulfate containing 4–8% combined sulfur and 20–34% acetyl, approximately 11–100%, based on the weight of the cellulose ester salt, of triethylene glycol and a stabilizing amount of urea.

7. A melt spun water-soluble plastic fiber essentially consisting of a water-soluble salt of cellulose acetate sulfate containing 4–8% combined sulfur and 20–34% combined acetyl, approximately 11–100%, based on the weight of the cellulose ester salt, of monacetin and a stabilizing amount of urea.

References Cited in the file of this patent

UNITED STATES PATENTS

| | | |
|---|---|---|
| 1,866,532 | Haskins | July 12, 1932 |
| 2,511,229 | Thomas | June 13, 1950 |
| 2,622,079 | Crane | Dec. 16, 1952 |
| 3,000,876 | Touey et al. | Sept. 19, 1961 |